US005278568A

United States Patent [19]
Enge et al.

[11] Patent Number: 5,278,568
[45] Date of Patent: Jan. 11, 1994

[54] METHOD OF AND APPARATUS FOR TWO-WAY RADIO COMMUNICATION AMONGST FIXED BASE AND MOBILE TERMINAL USERS EMPLOYING METEOR SCATTER SIGNALS FOR COMMUNICATIONS INBOUND FROM THE MOBILE TERMINALS AND OUTBOUND FROM THE BASE TERMINALS VIA LORAN COMMUNICATION SIGNALS

[75] Inventors: Per K. Enge, Groton; Paul R. Johannessen; Julian J. Bussgang, both of Lexington, all of Mass.

[73] Assignee: Megapulse, Incorporated, Bedford, Mass.

[21] Appl. No.: 877,829

[22] Filed: May 1, 1992

[51] Int. Cl.⁵ .......................... H04B 7/00; G01S 1/24
[52] U.S. Cl. ................................... 342/367; 342/389; 455/54.1
[58] Field of Search ............... 342/388, 389, 391, 367, 342/450, 453, 457; 364/752; 455/54, 54.1

[56] References Cited
U.S. PATENT DOCUMENTS

| | | | |
|---|---|---|---|
| 3,870,999 | 3/1975 | Matthews | 342/389 |
| 4,845,504 | 7/1989 | Roberts et al. | 342/457 |
| 4,985,707 | 1/1991 | Schmidt et al. | 342/370 |
| 5,134,715 | 7/1992 | Parl et al. | 455/64 |

*Primary Examiner*—Gregory C. Issing
*Attorney, Agent, or Firm*—Rines & Rines

[57] ABSTRACT

A method of and apparatus for two-way radio meteor scatter communication amongst mobile transceiver-equipped terminals and fixed meteor scatter base terminal(s) that comprises communicating high volume point-to-point inbound information from the mobile terminals to the base terminal(s) and outbound information from the base terminal(s) to particular mobile terminals by radio meteor scatter, and broadcasting outbound information from the base terminal(s) to many mobile terminals by supplemental Loran communications short messages modulated upon Loran radio positional and navigation transmissions.

18 Claims, 1 Drawing Sheet

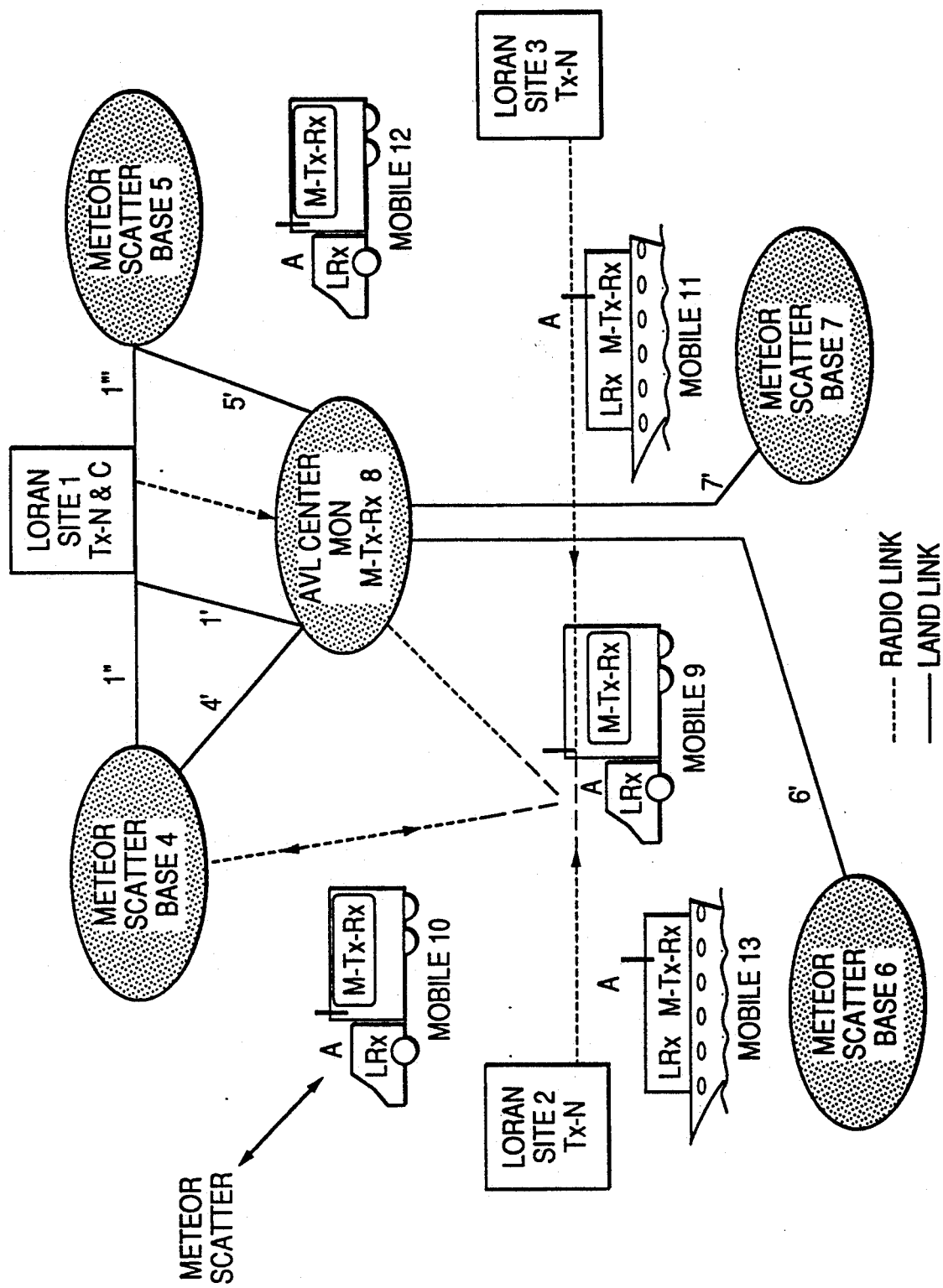

METHOD OF AND APPARATUS FOR TWO-WAY RADIO COMMUNICATION AMONGST FIXED BASE AND MOBILE TERMINAL USERS EMPLOYING METEOR SCATTER SIGNALS FOR COMMUNICATIONS INBOUND FROM THE MOBILE TERMINALS AND OUTBOUND FROM THE BASE TERMINALS VIA LORAN COMMUNICATION SIGNALS

The present invention relates to two-way base and mobile terminal radio communication methods and systems employing meteor scatter, being more particularly directed to the synergistic use of Loran broadcast navigational signals with added communication data therein for outbound transmission of information from the meteor scatter base terminals to mobile users to obviate previous limitations in meteor scatter outbound communication from the base terminal to such mobile users and to realize an effective automatic vehicle location system.

BACKGROUND OF INVENTION

In meteor scatter communications systems, it is advantageous to employ two-way communications, so as to acknowledge when a meteor scatter message was received at the base from a mobile terminal and so as to control communications within a network. As before stated, the current invention involves a two-way mobile communication system based on a synergistic use of the Loran broadcasts and of such meteor scatter communications, wherein the Loran navigation signal transmissions are supplemented with a communication capability for transmitting a small amount of information at a time; and wherein such communication capability can be used to broadcast to many users, and be generally available without waiting for specific propagation conditions unlike in prior meteor scatter systems. The availability of a return signal via meteor scatter communication from remote sites also permits a central site ("the base" or "base station") to receive position data from the remotes and determine what position corrections are necessary and to monitor and display the location of the mobiles.

It is well known that the outbound Loran broadcast from a group of synchronized Loran base stations can be used to allow mobile stations, or more generally remote stations distributed over an area, receiving the Loran signal, to fix their position from the knowledge of the positions of the fixed base Loran sites and from the differential times of Loran signal arrival. Suitable transmitters for Loran-C broadcasting are described, for example, in U.S. Pat. Nos. 3,711,725; 3,889,263; 4,001,598; 4,151,528; and 4,423,419 of one of the common assignees of the present invention; and typical suitable receivers, as for mobile users (boats, aircraft, ground vehicles), in U.S. Pat. Nos. 3,736,590; 3,774,210; 3,921,076; 4,392,138; and 4,482,896.

Not so well known, but now proven, is the fact that the Loran navigation signal broadcasts can also be modified simultaneously to communicate data outbound to the mobile users by suitable supplemental modulating of the Loran navigation signal to send up to between, for example, 20 and 100 bits per second of communications data to ranges of up to 1000 kilometers without affecting the basic navigational function of the Loran signal. Such techniques are described in U.S. Pat. Nos. 4,800,391 and 4,821,038 of said common assignee.

While such communications use of the Loran broadcast is limited, it is, for example, entirely adequate to advise a particular mobile terminal, in a specified network of terminals, that a meteor scatter link is to be established, or to acknowledge successful receipt of its message to the base via meteor scatter. This new capability permits the base station to address mobile terminals individually and in groups and obviates previous problems associated with the control of meteor scatter communications between a mobile terminal in the net and the base. Without such outbound communication, mobile terminals have to follow a very strict protocol of who reports when, in order to avoid having several mobile terminals reporting at the same time, thus interfering with one another.

In turn, meteor scatter communications from mobile terminals can be used to provide an inbound link to the fixed Loran sites, which Loran communications alone, being one-way (outbound), cannot provide. Thus, in accordance with the present invention, a mobile terminal can readily report its location and status to the meteor scatter base station, which can thus track the reporting terminals. With the present invention, the inbound link becomes more efficient, because of the availability of acknowledgment by Loran, particularly since the base may not be able to use the same meteor trail outbound to acknowledge the receipt of the inbound message. In addition, meteor scatter communications can now also be used for a particularly efficient transfer of short messages from one user outbound to other mobile users in the same net via the base.

Prior Automatic Vessel or Vehicle Location Systems

While concerned with and applicable to a wide variety of mobile communications, one of the most important applications of the techniques herein is in automatic vehicle and vessel location ("AVL") systems.

Prior AVL systems determine the position of ground vehicles including trucks, trains and buses, and marine vessels, and carry messages to and from these mobile users. In particular, they carry position report from the mobiles back to central dispatching and monitoring centers.

AVL systems may potentially serve to monitor the dispatch and location of over 700,000 trucks in the United States, and the 600,000 trucks in Europe. Additionally, they may be used to monitor marine traffic and avert catastrophes like the recent Exxon Valdez grounding in Prince William Sound. Indeed, the United States Coast Guard is currently planning to implement the AVL system for the Prince William Sound, Ak., and is investigating the need for marine AVL systems nationwide, or eventually, perhaps worldwide.

In general, AVL systems require a means for locating a large number of mobile terminals, and sending messages to and from these mobiles. To date, the following AVL technologies have been used or have been proposed for use:

Geostationary Satellites: Qualcom, Communication Satellite Corporation ("Comsat"), and the American Mobile Satellite Consortium ("AMSC") are some of the companies which market, or have intended to market, AVL systems which use satellite links for communication to and from the mobile users. While the intial system concepts advanced by Qualcom and Geostar used Loran-C as the positioning system, Qualcom has also tested a system called Quaspr, which uses the satellite signals also for position fixing.

Geostar has announced plans to field a system which will be exclusively based on satellites. The systems proposed by Comsat and AMSC will be capable of using either Loran-C or satellite systems such as the Global Positioning System (Navstar/GPS) or Glonass (the Soviet equivalent of GPS) as the position location systems.

Low Earth Orbit Satellites: Motorola, Orbcomm, Starsys and Leosat are some of the organizations which have proposed mobile satellite systems based on an array of satellites in low earth orbit ("LEO"). These systems would result in less expensive and smaller mobile user radio equipment, because LEO satellites are closer to the earth and as such the mobile could function properly, radiating less power than is needed to reach satellites in higher orbits. However, because satellites in low earth orbits are not geostationary, such systems require a large number of satellites for complete coverage; for example, Motorola's proposed world-wide satellite system to be placed in service in 1997 called Iridium, because it will include 77 satellites.

Line of Sight Radio: Line of Sight ("LOS") radio systems are widely used for point-to-point mobile communications. For mobile vehicle use, LOS systems include the Specialized Mobile Radio Systems ("SMRS") and cellular telephone networks. These systems can clearly be used to transfer data and voice communications to and from mobile users. They are limited, however, generally, in that they can reach mobile users only within the line of sight of the transmitters. For this reason, the area coverage of such systems requires an extensive network of transmitters. At the present time, such networks for mobile users cover only a small fraction of the United States, and further, for economic reasons, that coverage is generally limited only to urban areas.

Meteor Scatter: Transtrack, Pegasus and Meteor Communication Corporation ("MCC") are some of the companies that have proposed, in various forms, AVL systems which use Loran (or eventually, GPS) as the positioning system, and meteor scatter communications, in both directions, as the link between the mobile user and the base station. Since these are the most related to the concepts of the present invention, their background will now be described.

Meteor Scatter Communication

First experiments with meteor scatter communication ("MSC") were made originally during the 1950's, employing ionized trails left by billions of tiny meteors which enter the earth's atmosphere daily. The kinetic energy of meteors is sufficient to ionize a column of air up to 12 miles long in the E-layer of the ionosphere. Such trails, when properly oriented, act, in effect, as "nature's satellites" and are capable of reflecting radio signals from one location back to another position on the earth. Thus, two users at distances of between 500 to 1300 miles, can communicate with each other by bouncing signals off such trails. Since each ionized meteor trail which appears decays shortly thereafter, the availability of the path between any two locations occurs in bursts, and the communication between any two points is possible also only in bursts. Users at shorter distances can also communicate, but may have to bounce their signals off trails located in front of them or behind them rather than between them.

In the more advanced prior systems, two terminals establish a meteor connection by one terminal sending out a strong "probe" signal at a prearranged frequency. The probe signal may be a continuous or interrupted tone. It has to have sufficient power to be rapidly detected even in urban noise. A weak probe signal would consume too much time before it is detected at the mobile position. Although this signal is sent, it will not be detected at the other end until an appropriately oriented meteor trail appears. After detection of the probe, the receiving terminal has a short interval before the trail decays and during which it can acknowledge the link is established and then wait for a message from the base or transmit its message to the base. Typically, the message is sent on another frequency, close to the probing frequency, or during an interval during which the probe signal is turned off. If messages are short and the trails have a long duration, a message can be sent in one direction and a return message can also be sent then in the other direction. The exchange can last only for the duration of the trail, which lasts a few seconds, or at most about a minute. Shorter pulses can be used to provide higher data rates. An ionized meteor trail, however, is typically ionized densely enough to support short pulses, and therefore higher data rate transmission only for perhaps 100 milliseconds, and then gradually decays. If the exchange in one direction is complete and successful, it is useful to have an acknowledgment sent in the other direction. If not, then the users must wait for the occurrence of another appropriate trail and complete the communication. Fortunately, the occurrence of meteor trails is frequent. Radio signals in the 30- to 100-MHz range are reflected best by meteor trails. The trails persist in density, as an effective reflector, less time at higher radio frequencies than at lower frequencies. Thus, the prime radio frequencies for meteor scatter communications are around 40 to 50 MHz; i.e., in the lower part of the very high frequency (VHF) band (Reference: The ARRL Handbook for the Radio Amateur, published by American Radio Relay League, Newington, Conn., 1990, pp. 22-14 to 22-15). The 25 to 50 MHz band is generally available for mobile communications. Because at higher frequencies reflection of signals requires higher ionization densities, with transmission at higher frequencies less time is available, and it becomes impractical at such higher frequencies to acknowledge the receipt of a message using the same trail. However, higher frequency systems can function with smaller antennas which is convenient for mobile users.

In the case of AVL systems, meteor scatter base stations with a range of 500 to 1,000 miles can be placed across the country. These would typically use 1 kW transmitters and large antennas to radiate enough power to the mobile receiver so that its antenna can be small. Transmission from the base probe is continuous until a mobile unit responds to confirm contact. The mobile units have a small (typically, one or two meter) whip or loop antenna, a receiver, and a relatively small (200 Watt) transmitter. The mobile units listen for a probe from the base station which is addressed to them. When they receive such a probe, they can acknowledge that the link is established or send their message reporting their position, status, or other information.

AVL systems based on meteor scatter communications enjoy a number of important advantages. The mobile unit can be small, the range of operation can reach 1000 miles, and the users do not need to pay burdensome satellite time lease (or use) charges. These systems, on the other hand, also suffer from the following problems:

(1) Reliability/Capacity Tradeoff - As with all communication systems, the reliability of a meteor scatter link can be improved by using special signal processing techniques, such as forward error correction. Such techniques, though, consume channel capacity, delay completion of the message, and thus may prevent the base station from decoding an incoming message before the meteor trail decays and leave no time for acknowledging the successful reception of the message using the same meteor trail as the message. In that case, the base station must wait for a new meteor trail to send the message to the mobile which acknowledges the successful reception of the last message or requests the retransmission of the last message. Consequently, the delay introduced for the sake of reliability of the link can significantly decrease the capacity of the link;

(2) Interference During Sporadic E Conditions - At times, the "E layer" in the ionosphere, at between 50 and 60 miles in altitude, becomes a strong reflector of radio signals. These effects are most common during the months of May, June and July, but they also can appear in December/January, or indeed at any time. During these so-called "sporadic E" conditions, meteor scatter probe signals from distant base stations, that would not normally be strong enough, become received at unintended mobile unit sites. This may cause the mobile to falsely assume that the desired link exists and respond, although there is not a meteor scatter link to the intended destination. Also meteor scatter message signals destined for other sites, reflected by the E-layer, may arrive at an unintended receiver strong enough to interfere with each other or with the intended signal from the nearby base station which normally communicates properly with the given mobile unit. To overcome some of these problems generated by the occurrence of the E-layer, the mobile units could perhaps still respond reliably by transmitting only one at a time. The interference, however, may still garble the outbound messages from the base stations to the mobile;

(3) High Urban Noise - Man-made noise is prevalent in the frequency band used by meteor scatter communications. This noise troubles meteor scatter communications most when the mobile is located in a major urban area. This problem is serious because, although the fixed base stations can be carefully located in low noise environments, the mobiles must be free to travel into and around urban areas;

(4) Broadcast to a Multitude of Mobile Users - At any one time, a meteor scatter base station can communicate to those mobile users for whom an appropriately oriented trail exists. A "probe" signal in either direction is needed to establish whether or not such a connecting trail exists, and this temporary link may be used. The probe signal permits each desired connection to be validated and closed by an appropriate "acknowledgment" signal carrying the identity of the mobile, if from the mobile; or the address of the mobile, if from the base. A typical meteor scatter base station cannot readily and simultaneously broadcast data to a multitude of mobile users. Moreover, because of the unpredictable and fleeting nature of meteor scatter link availability, it is usually necessary to operate meteor scatter links in a larger net and according to a strict pre-arranged schedule of time and frequency and precise operating standards.

All of the above problems can be solved or to a large extent overcome, by the current invention, which employs the available, but little appreciated, communication capability of the Loran-C signal, before described, and in a synergistic new combination with meteor scatter techniques. It is therefore in order to review briefly the prior Loran-C technology and use.

Prior Loran-C Communications

Starting in the 1940s, the Long Range Navigation System (Loran-C) was developed by the United States and the Soviet Union (called "Chayka") to provide position information to mobile users. Currently, Loran-C provides service to nearly a million maritime, airborne and terrestrial users throughout most of the Northern Hemisphere.

As described in the first of the above-referenced patents, each Loran transmitter (also known as a Loran station or Lorsta) periodically emits a group of 8 pulses. Each such pulse has a duration of approximately 200 microseconds and a center frequency of 100 KHz. Loran transmitters are grouped into chains, and every transmitter in a given chain sends its group of pulses every group repetition interval ("GRI"). The GRI varies from 50 to 100 milliseconds. Each chain contains one master and two to five secondary stations, where the secondary transmissions are synchronized to the master transmission.

A Loran-C user receiver, such as of the type described in previously referenced receiver patents, measures the time difference (TD) between the arrival of the pulse groups from the master station and the secondary stations. The transmitter locations and the nominal emission delays are well known; and the propagation speed of the Loran pulse can be accurately estimated. Each measured time difference, therefore, defines a hyperbolic line of position (LOP) for the user. The intersection of two such LOPs defines the user's position.

The transmitted Loran-C signal has a groundwave component which travels along the surface of the earth, and a skywave component which is reflected off the ionosphere. The groundwave is stable and predictable. The design of the Loran pulse allows the receiver to separate the groundwave from the skywave as described in the earlier referenced patents. The groundwave attenuates as it propagates over earth because of finite ground conductivity. This attenuation limits each chain's range to approximately 500 nautical miles of the master station over land and 800 nautical miles over sea.

As before stated, what is less known, but has now been established, is that the Loran-C signal can also be used simultaneously to communicate to the mobile user at data rates of 20 to 100 bits per second per transmitter. Prior Loran systems instrumented for communications generally modulate the position (or equivalently the phase) of the individual pulses to send data. For example, a "1" is typically sent by first retarding a pulse by 1.0 to 1.25 microsecond, and then advancing a pulse by the same amount. A "0" is sent by first advancing a pulse and then retarding a pulse. Clearly, the amount of signal modulation must be limited to avoid unacceptable interference with the standard navigation function of the Loran signal. Usually, if the modulation is limited to 1.0 to 1.25 microseconds, it will not degrade the navigation function of the signal. Additionally, the modulation preferably consists of a "balanced" pair of shifts so that the pulse position modulation will not introduce a bias into position estimates.

Two prior Loran systems with communication capability which have been deployed are the Clarinet Pilgrim System and the USCG Communication System. Clarinet Pilgrim was used on the Loran-C chain in the Northwest Pacific, and was used as a redundant link in the United States Navy fleet communications. The USCG system is still in use as a redundant link in USCG inter-station communication. As such, it handles chain control and Loran-C operational and administrative data.

Previously referenced U.S. Pat. Nos. 4,800,391 and 4,821,038 further describe these prior systems and present improved techniques for simultaneous navigation and communication transmissions with reduced navigation and skywave navigation location errors. This provides significantly reduced interference to the navigation function of the Loran signal relative to the Clarinet Pilgrim and the USCG Communication System and also allows for the transmission of additional dedicated communication pulses. Indeed, the minimum data rate of 20 bits per second is achieved by modulating the position (or phase) of the standard pulses in a group of 8 navigation pulses. Higher data rates can be achieved by adding further dedicated communication pulses at the end of the standard group of 8. In general, such Loran communication systems are expected to communicate reliably over distances up to several hundred nautical miles.

The present invention is directed to a novel combination of such Loran-C navigation- communication techniques with modified meteor scatter communication techniques admirably to mitigate limitations in the latter, including the before-mentioned strict reporting protocol, interfering mobile terminal reporting, and inherent delays in acknowledgment and reliability.

Objects of Invention

It is thus a principal object of the present invention to provide a new and improved method of and apparatus for two-way communication between fixed bases and mobile users employing fixed base outbound Loran combined navigational and communication data signals and meteor scatter for enhanced communications from and among mobile users, and that obviate the above-mentioned and other disadvantages and limitations in prior meteor scatter communication systems. The present invention could be particularly applicable to automatic vehicle and vessel location (AVL) systems.

Other and further objects will be explained hereinafter and are more particularly delineated in the appended claims.

SUMMARY OF INVENTION

In summary, however, from one of its broader aspects, the invention embraces a method of two-way radio meteor scatter communication amongst mobile transceiver-equipped terminals and fixed meteor scatter base terminal(s) that comprises communicating inbound (and outbound) information from the mobile terminals to the base terminal(s) (or vice versa) by communicating outbound information from the base terminal(s) to a number of mobile terminals by supplemental Loran communications messages modulated upon Loran radio positional and navigation transmissions.

The two-way mobile communication system of the invention is based on a synergistic use of the Loran navigation signal and simultaneous communication signal broadcasts and of meteor scatter radio communications, with the Loran broadcasts being used to communicate data outbound from fixed bases to the mobile users. Communications are accomplished by modulating the Loran navigation signal to send, for example, up to between 20 and 100 bits per second to ranges of up to 1000 kilometers and without interfering with the navigation function of the Loran signal. The meteor scatter radio communications is used to provide inbound links from the mobile users to the fixed base sites, which Loran communications cannot provide. Meteor scatter is also used to transfer long messages outbound between individual mobile users. The use of outbound Loran broadcasts serves to obviate previous problems associated with meteor scatter communications to and between mobile users.

Preferred and best mode embodiments and designs are hereinafter set forth.

Drawings

The invention will now be described with reference to the accompanying drawing, the single figure comprising an operational block diagram of a combined meteor scatter-Loran-C system network illustrating the invention in preferred format.

DESCRIPTION OF PREFERRED EMBODIMENT OF THE INVENTION

The system level block diagram of the drawing illustrates a combined meteor scatter/Loran system network constructed in accordance with the invention and that provides an effective and novel use of Loran communications to obviate some of the major difficulties previously associated with mobile communication using meteor scatter, as before stated.

The system is shown comprising three Loran base sites, 1, 2 and 3 and four meteor scatter base site terminals 4, 5, 6 and 7. The fixed site 1 is shown located in the immediate vicinity of an Automatic Vehicle Location (AVL) Center 8 and is connected to it by a local link, such as a telephone line, fiberoptic cable or coaxial cable 1'. The fixed site 1 has a Loran transmitter Tx - N and C, as of the type described in the earlier referenced patents, which, in addition to its navigation signal transmission N, can be modulated to transmit short messages C using the Loran-C communication techniques above described and more specifically taught in said U.S. Pat. Nos. 4,800,341 and 4,821,038. The base sites 2 and 3 also have Loran transmitters, but they may not need to be capable of Loran communications, serving only as navigation positional signal transmitters Tx-N. In addition, the drawing shows five mobile terminals (or vehicles) 9, 10, 11, 12 and 13, mobiles 9, 10 and 12 being shown for illustrative purposes as automotive vehicles, and 11 and 13 as boats. Each mobile terminal has a Loran receiver LR as of the type before described in the earlier referenced receiver patents, which receiver is modified to receive communication signals, and a meteor scatter transmitter and receiver M-Tx-Rx, of well-known type, being thus equipped for meteor scatter and for Loran navigation and communication signal reception. The AVL Center 8 is also provided with a meteor scatter transmitter and receiver M-Tx-Rx (transceiver) as well as a system for monitoring the location of mobile terminals represented at MON. The AVL Center may also be connected by land lines (not shown) to the other fixed sites, i.e., 2 and 3, or it may be connected to them via radio. Each transmitter and receiver, as is well known, will have an appropriate antenna suitable for its frequency, schematically shown at A on the mobile terminals.

The AVL Center is also shown connected to meteor scatter base fixed site 4–7 by respective links 4'–7' that can convey, in one direction, requests for vehicle location information and, in the other direction, information from the AVL Center about position location of the mobiles and/or other dispatching data. The Center, the meteor scatter bases and the mobile vehicles communicating with them comprise the AVL network.

Typically, the AVL Center relies on the prearranged meteor scatter protocol, or initiates, at a particular time, an inquiry about location and/or status of one or more vehicles in the AVL network by causing the Loran transmitter at site 1 to broadcast a proper message using its communication facility C. Suppose that vehicle 10 was one of those thus addressed and interrogated. Vehicle 10 awaits until the probe signal from the meteor scatter base is detected, thus confirming a link exists, and then responds, in its proper sequence, to the AVL Center using its meteor scatter transmitter M-Tx. The response frequency to be used is generally preassigned. The position report from vehicle 10 is based on the Loran data it has received and processed from Loran navigation signals from sites 1, 2 and 3, or on other data, such as a known ground position, or position data derived from a satellite position location system such as the GPS (Global Positioning System) system, or any combination thereof. Vehicle 10 may be stationary when it begins transmission, or it may be in motion. Messages received from 10 via the meteor scatter receiver M-Rx connected to the AVL Center 8 may be used, for example, to update the status and location of vehicle 10, or to transmit any other desired message.

In addition, when vehicle 10 has sensed the probe signal and has followed it up with its meteor scatter radio transmission M-Tx, if the meteor scatter path still exists, site 4 can respond back to the mobile 10, using meteor scatter. Alternatively, when the trail becomes too weak, the acknowledgment of the entire message, or a request to repeat can be communicated back via Loran modulation from site 1, not depending on meteor scatter.

The Loran stations 1, 2 and/or 3 may be connected to the meteor scatter bases 4, 5 and 6 through phone lines, such as 1' and 1", or other appropriated communications for these fixed sites. In actuality, the number of Loran stations may be higher than three, and the numbers of meteor scatter base stations and of mobile units may be different than as shown and described. The network configuration discussed, moreover, is purely for purposes of illustration, and this invention is not limited in applicability or generality to these specific numbers of sites or to this specific configuration.

In the network, Loran communications can also be used to broadcast information which is of importance to all of the mobile users. Meteor scatter communication is used if a mobile user need to, or is required to, send data back to a meteor scatter base which sends out a probe. It can also be used if longer messages need to be sent from a base to an individual mobile terminal. In such a network, meteor scatter provides a significant inbound communication capability from the mobiles that Loran communications cannot provide. Meteor scatter also provides a higher data capacity from any base to individual users which Loran communications cannot efficiently provide. Moreover, the availability of Loran communications eliminates the difficulties which currently hinder mobile communications using meteor scatter. It also provides additional position location correction capability, as later more fully discussed. The main advantages of the invention thus are:

Network Control - Meteor scatter is most effective for point-to-point communications and requires two-way transmissions between the remote terminals 9, 10, 11, 12, 13 and any of the base stations 4, 5, 6 and 7. Thus, there is a limit as to how large a network can be handled using only meteor scatter communications in both directions. The availability of Loran-C broadcast communications such as from site 1 in the outbound direction, from a base to the remotes, facilitates the control of the network, even a large network, because management of meteor scatter communication from the remote terminals (i.e., in the inbound direction) can be assisted by Loran communication from the fixed bases. The network management functions that become possible include that individual terminals can be addressed, assigned time to transmit, and assigned frequency of transmission, their messages can be acknowledged, or they can be requested to repeat them.

Reliability/Capacity Tradeoff - As mentioned earlier, the performance of meteor scatter is significantly improved by the inclusion of special signal processing and data encoding techniques. However, these techniques reduce the data capacity of the link. With more of the available burst time taken up to transmit the message, the base station may have to use the next trail to acknowledge message reception. In the novel combined system of the present invention, however, Loran communication can be used to send the acknowledgment message, which is typically very short. Because of the availability of another communication link to acknowledge successful reception or to request a repeat transmission, the full time of availability of the meteor scatter link can be employed in one direction, and encoding or interactive message repeats can be used, without suffering as much in reduced capacity or delay.

High Urban Noise - As mentioned earlier, the mobile units 9-13 sometimes have difficulty in receiving the probe or meteor scatter communications in urban areas, because of man-made noise. By using the Loran communications, in accordance with the invention, some important messages may be sent to mobiles in such high noise areas. The mobile units will use meteor scatter to respond, because the receiving fixed base stations are generally located in low noise environments.

Broadcast to a Multitude of Mobile Users - As mentioned earlier, a meteor scatter base station can only communicate to mobile users for which an appropriately oriented trail exists. Thus, meteor scatter does not provide an efficient means to reach a large number of mobile users with a single message. In accordance with the present invention, use is made of the availability of Loran-C for the broadcast from base station of messages of interest to large groups of mobiles.

As additional examples, Loran communications can also be used to broadcast weather advisories and safety information, among other matters.

Position Location Correction - It is known that if a mobile unit can receive a propagation or timing error correction from a base station near it, the correctional data can be used at the mobile unit to greatly improve the accuracy of its positional location. The present invention can also be used to transmit such differential corrections to the mobiles and can thus enhance the accuracy of normal one-way position location derived from a broadcast system such as Loran, GPS, or Glonass. In particular, in the applications in which the remote mobile itself needs precise position location, propagation delay data available at a nearby base site can be used to generate corrections, as described for example by R. Goddard, "Real Time Loran-C Enhancement Using Differential Corrections", XVth Pacific Science Congress, Dunedin, New Zealand, February 1983, to be used by the mobile users to improve the accuracy of their initial positions fixes. Meteor scatter transmission from the nearby base site or Loran communication can be used outbound to carry the correctional signal.

Further modifications will occur to those skilled in this art, such being considered to fall within the spirit and scope of the invention as defined in the appended claims.

What is claimed is:

1. A method of two-way radio meteor scatter communication amongst mobile transceiver-equipped terminals and fixed meteor scatter base terminal(s) that comprises communicating inbound information from the mobile terminals to the base terminal(s) by meteor scatter communication, and communicating outbound information from the base terminal(s) to all mobile terminals by meteor scatter communication and by supplemental Loran communications messages modulated upon Loran radio positional and navigation transmissions.

2. A method as claimed in claim 1 and in which the information for said Loran communications messages is provided from the meteor scatter base terminal(s) by linking such base terminal(s) to a Loran transmission site.

3. A method as claimed in claim 2 and in which the inbound information communicated from the mobile terminals to the base terminal(s) comprises one or both of mobile status messages and positional data developed from the Loran positional and navigation transmissions received at any mobile terminal.

4. A method as claimed in claim 1 and in which the meteor scatter communications are used to carry high volume traffic from the base(s) to individual mobile terminals.

5. A method as claimed in claim 2 and in which the station transmitting the Loran communications messages is linked by telephone lines to the meteor scatter base terminal(s) to receive commands therefrom.

6. A method as claimed in claim 3 and in which an automatic vehicle or vessel location system is linked to the meteor scatter base terminal(s) and the Loran station(s), and the inbound data communicated from the mobile terminals includes position estimates based on Loran-C positional and navigation transmissions and the identity of the communicating mobile terminal.

7. A method as claimed in claim 6 and in which the Loran communications messages provide the mobile terminals with propagation and timing correction information to improve the precision of the mobile terminal position fixes and navigational data derived from one or more of the Loran transmissions satellite and other navigational radio transmissions.

8. A method as claimed in claim 6 and in which the base terminals apply differential Loran corrections to the estimated fixes received from the mobile terminals and communicate the same outbound by the Loran communications messages.

9. A method as claimed in claim 4 and in which the Loran communications messages transmit one or more of reports, instructions, and inquiries intended to relay important messages and/or control the mobile terminals in the network and the schedule, frequency and/or format of the meteor scatter communications, in order to increase the capacity and improve the efficiency of meteor scatter communications from the mobile terminals to the base terminals and from one mobile terminal to another.

10. A method as claimed in claim 4 and in which the Loran communication messages comprise acknowledgments that the base terminal(s) received meteor scattered inbound signals from mobile terminals.

11. Apparatus for two-way radio meteor scatter communication amongst mobile transceiver-equipped terminals and fixed meteor scatter base terminals having, in combination with a system comprising the transmission link of information between the mobile terminals and the base terminals by radio meteor scatter, the supplement of a Loran radio positional and navigation transmitter system incorporating means for generating Loran communications messages, incorporating information provided by the base terminals, simultaneously transmitted outbound with the positional and navigation transmission to the mobile terminals.

12. Apparatus as claimed in claim 11 and in which means is provided for communicating inbound to the meteor scatter base stations positional data developed from the Loran positional and navigation transmissions received at each mobile terminal.

13. Apparatus as claimed in claim 12 and in which the Loran communications messages comprise acknowledgments that the base terminals received meteor scattered inbound signals from mobile terminals.

14. Apparatus as claimed in claim 12 and in which the Loran communications messages comprise position location correctional data.

15. Apparatus as claimed in claim 11 and in which the meteor scatter base terminals are telephone-linked to the station transmitting the Loran communications messages.

16. Apparatus as claimed in claim 12 and in which the base terminals and the station transmitting the Loran communications messages are linked with an automatic vehicle location system for monitoring and tracking the positional and other data from the mobile terminals, with the Loran communications messages enabling outbound communications with the mobile terminals.

17. Apparatus as claimed in claim 16 and in which means is provided for enabling the Loran communications messages to contain propagation and timing correction information for the mobile terminals to improve the precision of their position fixes derived from one or more of the Loran positional and navigation transmissions, satellite positional transmissions, and other navigational radio transmissions.

18. Apparatus as claimed in claim 16 and in which means is provided for controlling the Loran communications messages by modulations responsive to commands received from one or both of the base terminals and the automatic vehicle location system.

* * * * *